US012254875B2

(12) United States Patent
Gaur et al.

(10) Patent No.: US 12,254,875 B2
(45) Date of Patent: Mar. 18, 2025

(54) MULTILINGUAL RE-SCORING MODELS FOR AUTOMATIC SPEECH RECOGNITION

(71) Applicant: Google LLC, Mountain View, CA (US)

(72) Inventors: Neeraj Gaur, Mountain View, CA (US); Tongzhou Chen, Mountain View, CA (US); Ehsan Variani, Mountain View, CA (US); Bhuvana Ramabhadran, Mt. Kisco, NY (US); Parisa Haghani, Mountain View, CA (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/589,220

(22) Filed: Feb. 27, 2024

(65) Prior Publication Data

US 2024/0203409 A1 Jun. 20, 2024

Related U.S. Application Data

(63) Continuation of application No. 17/701,635, filed on Mar. 22, 2022, now Pat. No. 12,080,283.

(Continued)

(51) Int. Cl.
*G10L 15/197* (2013.01)
*G10L 15/00* (2013.01)
(Continued)

(52) U.S. Cl.
CPC .......... *G10L 15/197* (2013.01); *G10L 15/005* (2013.01); *G10L 15/16* (2013.01); *G10L 15/22* (2013.01)

(58) Field of Classification Search
CPC ........ G02B 27/01; G06F 40/30; G06N 3/044; G06N 3/049; G06N 20/00; G08G 5/003;
(Continued)

(56) References Cited

U.S. PATENT DOCUMENTS 5,677,990 A * 10/1997 Junqua .................. G10L 15/197
704/255
5,745,649 A * 4/1998 Lubensky ............... G10L 15/16
704/254
(Continued)

OTHER PUBLICATIONS

Jul. 8, 2022 Written Opinion (WO) of the International Searching Authority (ISA) and International Search Report (ISR) issued in International Application No. PCT/US2022/021441.

(Continued)

*Primary Examiner* — Gerald Gauthier
(74) *Attorney, Agent, or Firm* — Honigman LLP; Brett A. Krueger; Grant Griffith (57) ABSTRACT

A method includes receiving a sequence of acoustic frames extracted from audio data corresponding to an utterance. During a first pass, the method includes processing the sequence of acoustic frames to generate N candidate hypotheses for the utterance. During a second pass, and for each candidate hypothesis, the method includes: generating a respective un-normalized likelihood score; generating a respective external language model score; generating a standalone score that models prior statistics of the corresponding candidate hypothesis; and generating a respective overall score for the candidate hypothesis based on the un-normalized likelihood score, the external language model score, and the standalone score. The method also includes selecting the candidate hypothesis having the highest respective overall score from among the N candidate hypotheses as a final transcription of the utterance.

20 Claims, 6 Drawing Sheets

Related U.S. Application Data (60) Provisional application No. 63/166,916, filed on Mar. 26, 2021.

(51) Int. Cl.
 *G10L 15/16* (2006.01)
 *G10L 15/22* (2006.01)

(58) Field of Classification Search
 CPC ..... G10L 15/005; G10L 15/02; G10L 15/132; G10L 15/14; G10L 15/16; G10L 15/1815; G10L 15/183; G10L 15/187; G10L 15/197; G10L 15/22; G10L 15/26; G10L 15/32
 See application file for complete search history.

(56) References Cited

U.S. PATENT DOCUMENTS

| | | | | |
|---|---|---|---|---|
| 11,380,308 | B1* | 7/2022 | Pandey | G06N 20/00 |
| 11,741,947 | B2* | 8/2023 | Tripathi | G10L 15/197 |
| | | | | 704/232 |
| 11,749,259 | B2* | 9/2023 | Peyser | G06N 3/049 |
| | | | | 704/232 |
| 11,790,899 | B2* | 10/2023 | Rastogi | G10L 15/197 |
| | | | | 704/232 |
| 12,080,283 | B2* | 9/2024 | Gaur | G10L 15/22 |
| 2010/0125458 | A1* | 5/2010 | Franco | G10L 15/22 |
| | | | | 704/255 |
| 2015/0243278 | A1* | 8/2015 | Kibre | G10L 15/187 |
| | | | | 704/243 |
| 2018/0068653 | A1* | 3/2018 | Trawick | G10L 15/16 |
| 2018/0082167 | A1* | 3/2018 | Kurata | G06N 3/044 |
| 2018/0330730 | A1* | 11/2018 | Garg | G10L 15/1815 |
| 2019/0287519 | A1* | 9/2019 | Ediz | G06F 40/30 |
| 2020/0143806 | A1* | 5/2020 | Sreedhara | G10L 15/22 |
| 2020/0160838 | A1* | 5/2020 | Lee | G10L 15/183 |
| 2021/0343277 | A1* | 11/2021 | Jaber | G10L 15/14 |
| 2022/0115008 | A1* | 4/2022 | Pust | G10L 15/26 |
| 2022/0188361 | A1* | 6/2022 | Botros | G02B 27/01 |
| 2022/0246150 | A1* | 8/2022 | Pust | G08G 5/003 |
| 2022/0270597 | A1* | 8/2022 | Qiu | G10L 15/22 |
| 2022/0310080 | A1* | 9/2022 | Qiu | G10L 15/02 |
| 2022/0310081 | A1* | 9/2022 | Gaur | G10L 15/22 |
| 2023/0186907 | A1* | 6/2023 | Hu | G10L 15/187 |
| | | | | 704/232 |
| 2024/0203409 | A1* | 6/2024 | Gaur | G10L 15/32 |

OTHER PUBLICATIONS

Variani Ehsan et al: "Neural Oracle Search on N-Best Hypotheses", ICASSP 2020—2020 IEEE International Conference on Acoustics, Speech and Signal Processing (ICASSP), IEEE, May 4, 2020 (May 4, 2020), pp. 7824-7828.

Ogawa Atsunori et al: "Rescoring N-Best Speech Recognition List Based on One-on-One Hypothesis Comparison Using Encoder-Classifier Model", 2018 IEEE International Conference on Acoustics, Speech and Signal Processing (ICASSP), IEEE, Apr. 15, 2018 (Apr. 15, 2018), pp. 6099-6103.

Ma Rao et al: "Neural Lattice Search for Speech Recognition", ICASSP 2020—2020 IEEE International Conference on Acoustics, Speech and Signal Processing (ICASSP), IEEE, May 4, 2020 (May 4, 2020), pp. 7794-7798.

Hu He et al: "Transformer Based Deliberation for Two-Pass Speech Recognition", 2021 IEEE Spoken Language Technology Workshop (SLT), IEEE, Jan. 19, 2021 (Jan. 19, 2021), pp. 68-74.

* cited by examiner

MULTILINGUAL RE-SCORING MODELS FOR AUTOMATIC SPEECH RECOGNITION

CROSS REFERENCE TO RELATED APPLICATIONS

This U.S. Patent Application is a continuation of, and claims priority under 35 U.S.C. § 120 from, U.S. patent application Ser. No. 17/701,635, filed on Mar. 22, 2022, which claims priority under 35 U.S.C. § 119(e) to U.S. Provisional Application 63/166,916, filed on Mar. 26, 2021. The disclosures of these prior applications are considered part of the disclosure of this application and are hereby incorporated by reference in their entireties.

TECHNICAL FIELD

This disclosure relates to multilingual re-scoring models for automatic speech recognition.

BACKGROUND

Automatic speech recognition (ASR) systems provide a technology that is typically used in mobile devices and other devices. In general, ASR systems attempt to provide accurate transcriptions of what a user speaks to the mobile device. More specifically, ASR systems generate multiple candidate transcriptions and output the candidate transcription that is most likely to match the speech input. In some instances, ASR systems output inaccurate transcriptions that do not match what the user actually spoke. In these instances, the ASR system may rescore the multiple candidate transcriptions and output an accurate transcription that matches the speech input. One challenge of rescoring, however, is that ASR systems rely on language information of the speech input to accurately rescore the multiple candidate transcriptions. As such, it is often cumbersome for ASR systems to perform rescoring in multilingual speech environments.

SUMMARY

One aspect of the disclosure provides a computer-implemented method that when executed on data processing hardware causes the data processing hardware to perform operations of using multilingual re-scoring models for automatic speech recognition. The operations include receiving a sequence of acoustic frames extracted from audio data that corresponds to an utterance. During a first pass, the operations include processing the sequence of acoustic frames using a multilingual speech recognition model to generate N candidate hypotheses for the utterance. During a second pass, for each candidate hypothesis of the N candidate hypotheses, the method includes: generating, using a neural oracle search (NOS) model, a respective un-normalized likelihood score based on the sequence of acoustic frames and the corresponding candidate hypothesis; generating a respective external language model score using a language model; generating a standalone score that models prior statistics of the corresponding candidate hypothesis generated during the first pass; and generating a respective overall score for the candidate hypotheses based on the un-normalized score, the external language model score, and the standalone score. The operations also include selecting the candidate hypothesis having the highest respective overall score from among the N candidate hypotheses as a final transcription of the utterance.

Implementations of the disclosure may include one or more of the following optional features. In some implementations, each hypothesis of the N candidate hypotheses includes a respective sequence of word or sub-word labels. Here, each word or sub-word label is represented by a respective embedding vector. The external language model may be trained on text-only data. In some examples, the NOS model includes a language-specific NOS model. In these examples, the operations further include receiving a language identifier that indicates a language of the utterance and selecting the language-specific NOS model from among a plurality of language-specific NOS models that are each trained on a different respective language.

Optionally, the NOS model may include a multilingual NOS model. In some implementations the external language model includes a language-specific external language model. In these implementations, the operations further include receiving a language identifier that indicates a language of the utterance and selecting the language-specific external language model from among a plurality of language-specific external language models that are each trained on a different respective language. The NOS model may include two unidirectional long short-term memory (LSTM) layers. In some examples, the speech recognition model includes an encoder-decoder architecture that includes a conformer encoder having a plurality of conformer layers and a LSTM decoder having two LSTM layers.

Another aspect of the disclosure provides a system that includes data processing hardware and memory hardware storing instructions that when executed on the data processing hardware causes the data processing hardware to perform operations. The operations include receiving a sequence of acoustic frames extracted from audio data that corresponds to an utterance. During a first pass, the operations include processing the sequence of acoustic frames using a multilingual speech recognition model to generate N candidate hypotheses for the utterance. During a second pass, for each candidate hypothesis of the N candidate hypotheses, the method includes: generating, using a neural oracle search (NOS) model, a respective un-normalized likelihood score based on the sequence of acoustic frames and the corresponding candidate hypothesis; generating a respective external language model score using a language model; generating a standalone score that models prior statistics of the corresponding candidate hypothesis generated during the first pass; and generating a respective overall score for the candidate hypotheses based on the un-normalized score, the external language model score, and the standalone score. The operations also include selecting the candidate hypothesis having the highest respective overall score from among the N candidate hypotheses as a final transcription of the utterance.

Implementations of the disclosure may include one or more of the following optional features. In some implementations, each hypothesis of the N candidate hypotheses includes a respective sequence of word or sub-word labels. Here, each word or sub-word label is represented by a respective embedding vector. The external language model may be trained on text-only data. In some examples, the NOS model includes a language-specific NOS model. In these examples, the operations further include receiving a language identifier that indicates a language of the utterance and selecting the language-specific NOS model from among a plurality of language-specific NOS models that are each trained on a different respective language.

Optionally, the NOS model may include a multilingual NOS model. In some implementations the external language model includes a language-specific external language model. In these implementations, the operations further include receiving a language identifier that indicates a language of the utterance and selecting the language-specific external language model from among a plurality of language-specific external language models that are each trained on a different respective language. The NOS model may include two unidirectional long short-term memory (LSTM) layers. In some examples, the speech recognition model includes an encoder-decoder architecture that includes a conformer encoder having a plurality of conformer layers and a LSTM decoder having two LSTM layers.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Automatic speech recognition (ASR) systems are becoming increasingly popular in user devices as the ASR systems continue to provide more accrue transcriptions of what users speak. Still, in some instances, ASR systems generate inaccurate transcriptions that misrecognize what the user actually spoke. In some configurations, ASR systems generate N best candidate hypotheses for a spoken utterance and output the best candidate hypothesis as the final transcription. The N best candidate hypotheses configuration, however, has almost a 50% lower word error rate (WER) compared to a one-best hypothesis configuration. Thus, in some implementations, the ASR systems will rescore the N best candidate hypotheses by integrating additional information to increase the WER. These rescoring implementations rely on language information (i.e., language identifier spoken by a user) in multilingual speech environments and only provide marginal WER improvements. The challenges discussed above identify a WER performance gap between ASR systems using N best candidate hypotheses configuration in comparison to the one-best candidate configuration.

Accordingly, implementations herein are directed towards methods and systems of executing a rescoring process that generates N candidate hypotheses for a corresponding utterance and selecting the most likely candidate hypothesis to output as a final transcription. In particular, during a first pass, the rescoring process generates N candidate hypotheses using a multilingual speech recognition model. Thereafter, during a second pass and for each candidate hypothesis, the rescoring process generate a respective un-normalized likelihood score using a neural oracle search (NOS) model, generates an external language model score, and generates a standalone score that models prior statistics of the candidate hypothesis. As will become apparent below, the NOS model may be a language-specific NOS model or a multilingual NOS model. Moreover, during the second pass, the rescoring process generates an overall score for each candidate hypothesis based on the un-normalized likelihood score, the external language model score, and the standalone score. The rescoring process selects the candidate hypothesis with the highest overall score as the final transcription for the utterance.

Figure 1:
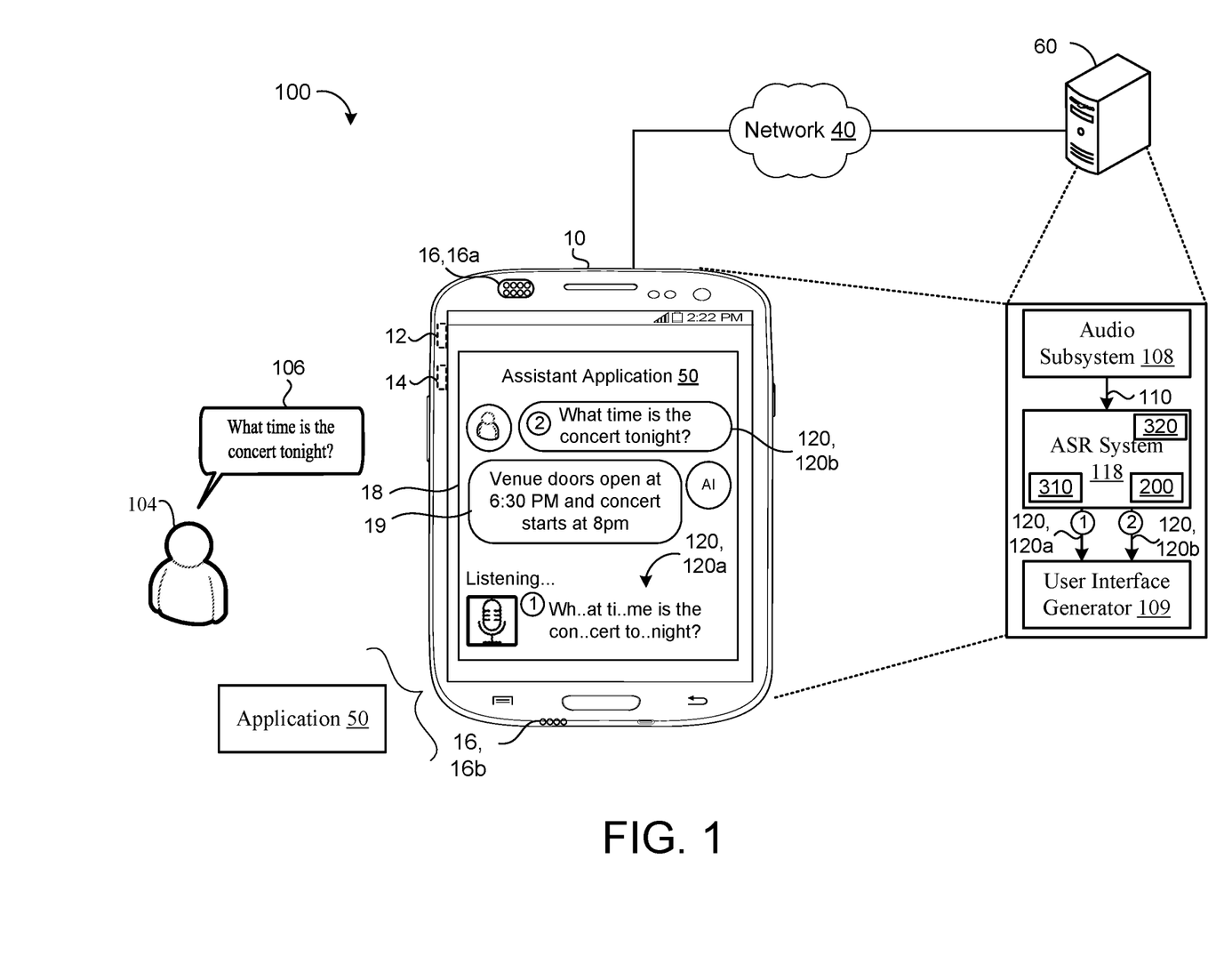
FIG. 1 is a schematic view of a speech environment executing an example speech recognition model.

FIG. 1 is an example of a speech environment 100. In the speech environment 100, a user's 104 manner of interacting with a computing device, such as a user device 10, may be through voice input. The user device 10 is configured to capture sounds (e.g., streaming audio data) from one or more users 104 within the speech environment 100. Here, the streaming audio data may refer to a spoken utterance 106 by the user 104 that functions as an audible query, a command for the user device 10, or an audible communication captured by the user device 10. Speech-enabled systems of the user device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile device (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the user device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implementing a speech recognition model (i.e., ASR model) 200 resides on the user device 10 of the user 104 and/or on a remote computing device 60 (e.g., one or more remote servers of a distributed system executing in a cloud-computing environment) in communication with the user device 10 via a network 40. The ASR system 118 may also implement one or more external language models 310 and a neural oracle search (NOS) model 320. The user device 10 and/or the remote computing device (i.e., remote server) 60 also includes an audio subsystem 108 configured to receive the utterance 106 spoken by the user 104 and captured by the audio capture device 16a, and convert the utterances 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the speech recognition model 200 receives, as input, the audio data 110 corresponding to the utterance 106, and generates/predicts, as output, a corresponding transcription 120 (e.g., speech recognition result/hypothesis) of the utterance 106. As described in greater detail below, the speech recognition model 200 may include an end-to-end speech recognition model 200 trained with variable look ahead audio context to allow the model 200 to set, during inference, different durations of look ahead audio context when performing speech recognition depending on how sensitive a query specified by the utterance 106 is to latency and/or how much tolerance the user 106 has for latency. For instance, a digital assistant application 50 executing on the user device 10 may require the speech recognition depending on how sensitive a query specified by the utterance 106 is to latency and/or how much tolerance the user 106 has for latency.

Figure 3A:
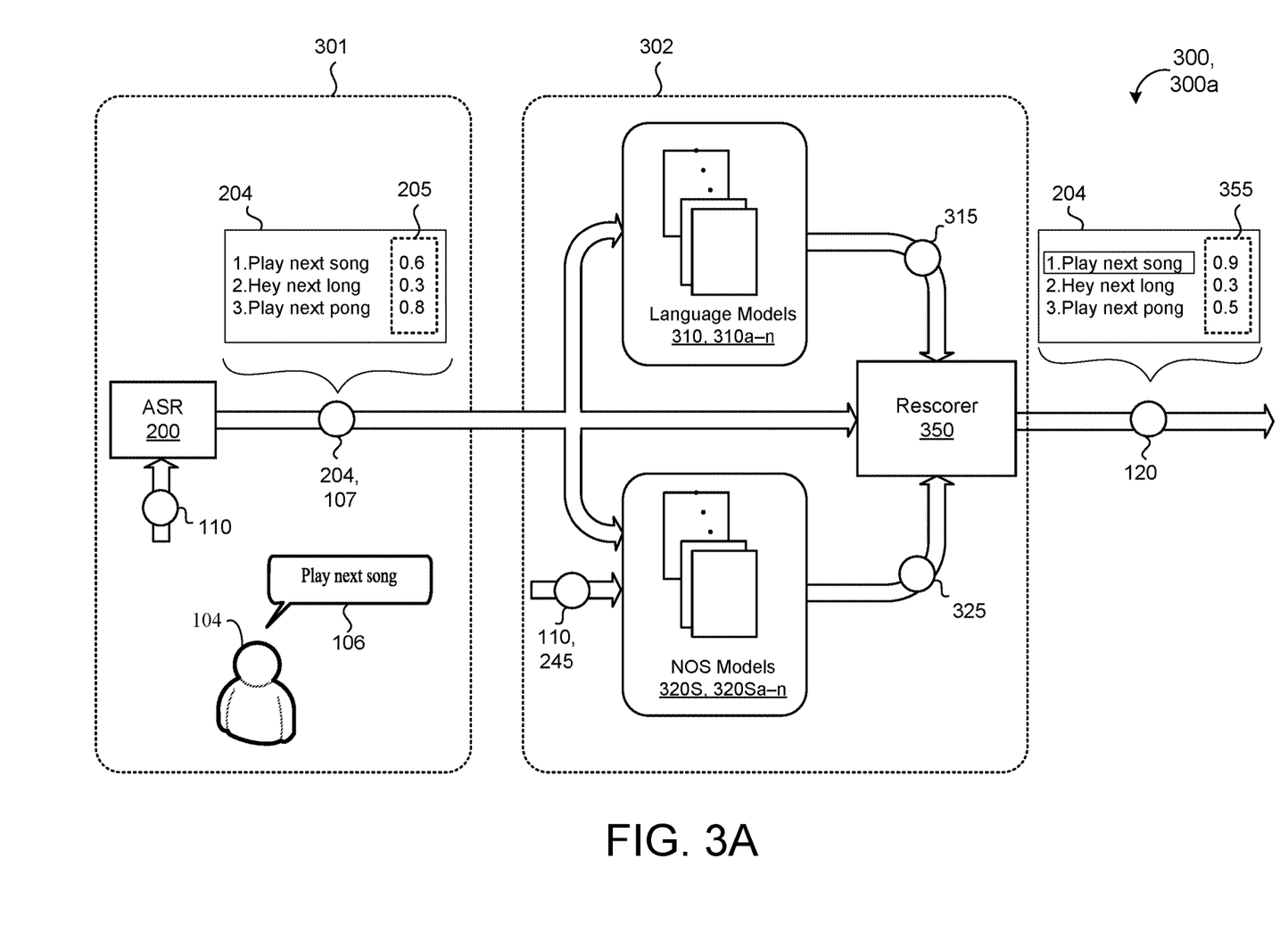
FIG. 3A is a schematic view of an example rescoring process using a plurality of language-specific neural oracle search (NOS) models.
Figure 3B:
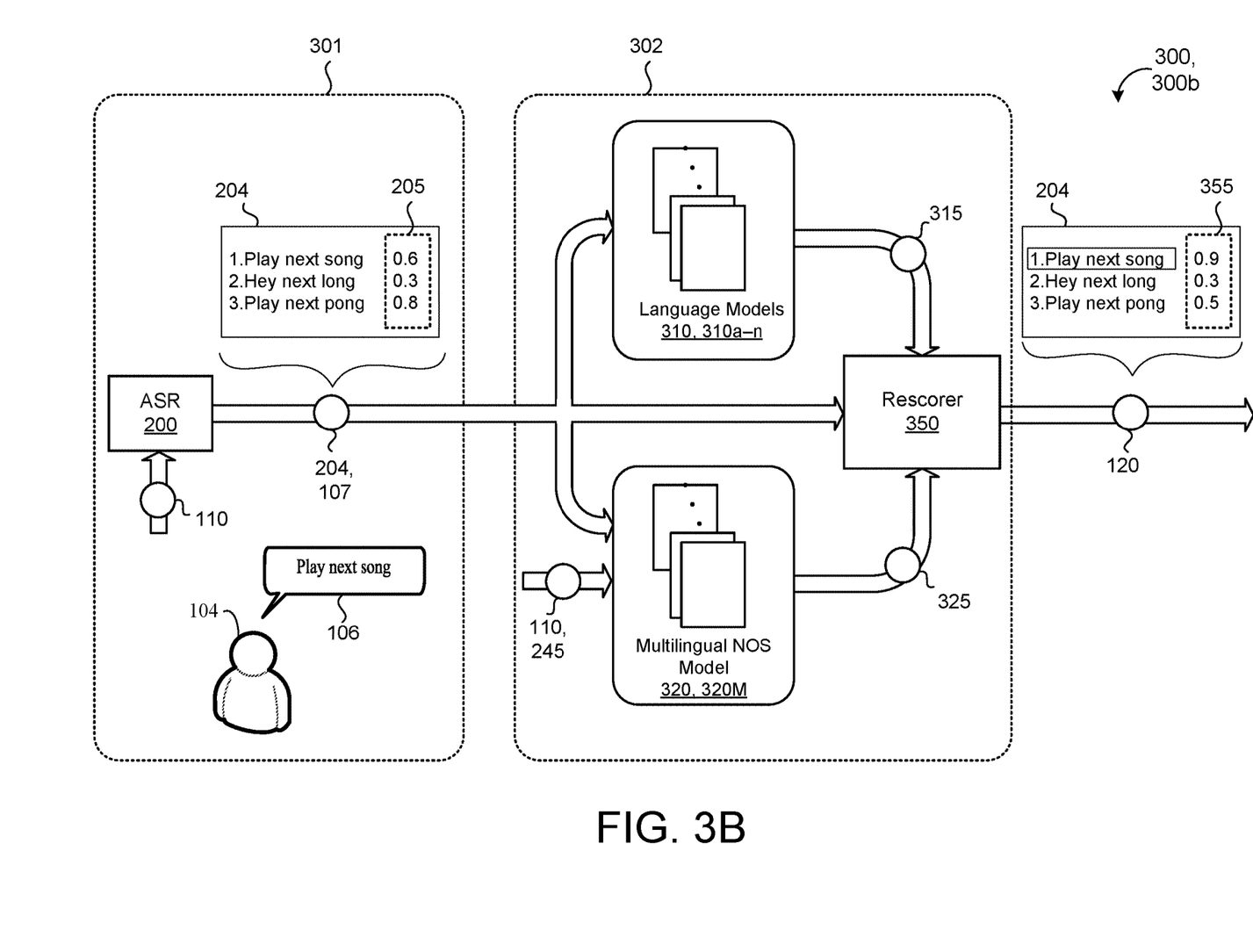
FIG. 3B is a schematic view of an example rescoring process using a multilingual NOS model.

In some implementations, the speech recognition model 200 performs streaming speech recognition on the audio data 110 during a first pass to generate N candidate hypotheses 204 (FIG. 3), and the NOS and language models 310, 320 rescore the N candidate hypotheses 204 during a second pass to generate a final transcription 120. For instance, in the example shown, the speech recognition model 200 performs streaming speech recognition on the audio data 110 to produce partial speech recognition results (i.e., partial transcription) 120, 120a (based on the N candidate hypotheses 204), and the language and NOS models 310, 320 rescore the N candidate hypotheses 204 to produce a final speech recognition result (i.e., final transcription) 120, 120b. Notably, the speech recognition model 200 may use a first look ahead audio context that may be set to zero (or about 240 milliseconds) to produce the partial speech recognition results 120a Thus, the final speech recognition result 120b for the input utterance 106 may be delayed from the partial speech recognition results 120a for the input utterance.

The user device 10 and/or the remote computing device 60 also executes a user interface generator 109 configured to present a representation of the transcription 120 of the utterance 106 to the user 104 of the user device 10. As described in greater detail below, the user device generator 109 may display the partial speech recognition results 120a in a streaming fashion during time 1 and subsequently display the final speech recognition result 120b during time 2. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription into synthesized speech for audible output by the user device 10 and/or another device.

In the example shown, the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Continuing with the example, the speech recognition model 200, while receiving the acoustic frames (i.e., audio data) 110 corresponding to the utterance 106 as the user 104 speaks, encodes the acoustic frames 110 and then decodes the encoded acoustic frames 110 into the partial speech recognition results 120a. During time 1, the user interface generator 109 presents, via the digital assistant interface 18, a representation of the partial speech recognition results 120a of the utterance 106 to the user 104 of the user device 10 in a streaming fashion that words, word pieces, and/or individual characters appear on the screen as soon as they are spoken.

During the second pass, and after all of the acoustic frames 110 corresponding to the utterance 106 are received, the ASR system 118 rescores each candidate hypothesis 204 of the N candidate hypotheses 204 using the language and NOS models 310, 320 and selects the candidate hypothesis 204 from among the N candidate hypotheses 204 that is the most likely the accurate transcription 120 of the utterance 106. During time 2, the user interface generator 109 presents, via the digital assistant interface 18, a representation of the final speech recognition results 120b of the utterance 106 to the user 105 of the user device 10. In some implementations, the user interface generator 109 replaces the representation of the partial speech recognition results 120a with the representation of the final speech recognition result 120b. For instance, as the final speech recognition result 120b is presumed to be more accurate than the partial speech recognition results 120a produced without leveraging look ahead audio context, the final speech recognition result 120b ultimately displayed as the transcription 120 may fix any terms that may have been misrecognized in the partial speech recognition results 120a. In this example, the streaming partial speech recognition results 120a output by the speech recognition model 200 and displayed on the screen of the user device 10 at time 1 are associated with low latency and provide responsiveness to the user 104 that his/her query is being processed, while the final speech recognition result 120b displayed on the screen at time 2 improves the speech recognition quality in terms of accuracy, but at increased latency. However, since the partial speech recognition results 120a are displayed as the user speaks the utterance 106, the higher latency associated with producing, and ultimately displaying the final recognition result is not noticeable to the user 104.

In the example shown in FIG. 1, the digital assistant application 50 may respond to the question posed by the user 104 using natural language processing. Natural language processing generally refers to a process of interpreting written language (e.g., the partial speech recognition results 120a and/or the final speech recognition result 120b) and determining whether the written language prompts any action. In this example, the digital assistant application 50 uses natural language processing to recognize that the question from the user 104 regards the user's schedule and more particularly a concert on the user's schedule. By recognizing these details with nature language processing, the automated assistant returns a response 19 to the user's query where the response 19 states, "Venue doors open at 6:30 PM and concert starts at 8 PM." In some configurations, natural language processing occurs on a remote server 60 in communication with the data processing hardware 12 of the user device 10.

Figure 2:
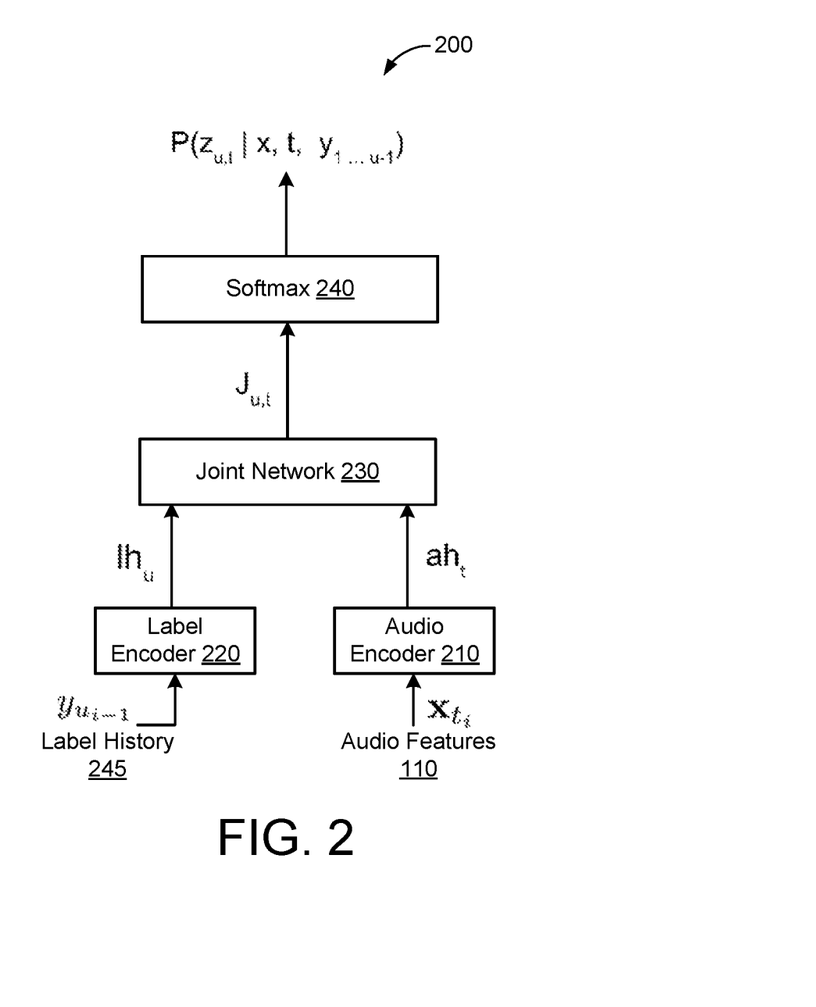
FIG. 2 is a schematic view of the example speech recognition model of FIG. 1.

Referring to FIG. 2, an example frame alignment-based transducer model 200a includes a Recurrent Neural Network-Transducer (RNN-T) model architecture which adheres to latency constraints associated with interactive applications. The use of the RNN-T model architecture is exemplary, and the frame alignment-based transducer model 200 may include other architectures such as transformer-transducer and conformer-transducer model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 incudes an encoder network 210, a prediction network 220, and a joint network 230. The encoder network 210, which is roughly analogous to an acoustic model (AM) in a traditional ASR system, may include a recurrent network of stacked Long Short-Term (LSTM) layers. For instance, the encoder reads a sequence of d-dimensional feature vectors (e.g., acoustic frames 110 (FIG. 1)) $x=(X_1, X_2, \ldots, X_T)$, where $Xt \in \mathbb{R}^d$, and produces at each output step a higher-order feature representation. This higher-order feature representation is denoted as $h_1^{enc}, \ldots, h_T^{enc}$.

Similarly, the prediction network 220 is also an LSTM network (i.e., LSTM decoder), which, like a language model (LM), processes the sequence of non-blank symbols (i.e., label history) 245 output by a final Softmax layer 240 so far, $y_0, \ldots, y_{u-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network then predicts $P(y_i|X_{t_i}, Y_0, \ldots, Y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network (i.e., audio encoder) 210 of the RNN-T model 200 includes is an encoder-decoder architecture having a Conformer-based encoder that includes a stack of conformer layers. Here, each conformer layer includes a series of multi-headed self-attention, depth wise convolution, and feed-forward layers. In some example, the Conformer-based encoder may include a stack of 17 conformer layers. The encoder network 210 may include other types of encoders having multi-headed self-attention mechanisms. For instance, the encoder network 210 may be a Transformer-based encoder or a lightweight convolutional (LConv) based encoder. The encoder network 210 may also be RNN-based including a series of LSTM layers. The prediction network 220 may be a LSTM decoder having two 2,048-dimensional LSTM layers, each of which is also followed by 640-dimensional projection layer. Alternatively, the prediction network 220 may include a stack of transformer or conformer blocks, or an embedding look-up table in lieu of LSTM layers. Finally, the joint network 230 may also have 640 hidden units. The Softmax layer 240 may be composed of a unified word piece or grapheme set that is generated using all unique word pieces or graphemes in a plurality of training data sets.

Referring now to FIGS. 3A and 3B, in some implementations, the remote server 60 (FIG. 1) executes an example rescoring process 300 for rescoring N candidate hypotheses 204 generated by the ASR model 200 during a first pass 301. Alternatively, the user device 10 (FIG. 1) may execute the example rescoring process 300 in addition to, or in lieu of, the remote server 60 (FIG. 1). The rescoring process 300 includes the first pass 301 that generates N candidate hypotheses 204, 204a-n ($H_1, H_2, \ldots, H_N$) for a sequence of acoustic frames 110 ($X_1, X_2, \ldots, X_T$) corresponding to an utterance 106. Moreover, the rescoring process 300 includes a second pass 302 that rescores each candidate hypothesis 204 of the N candidate hypotheses 204 by integrating additional information sources, discussed in greater detail below. As such, the second pass 302 includes a sequence classification objective configured to select the candidate hypothesis 204 from among the N candidate hypotheses 204 that is the most likely accurate transcription of the utterance 106.

In particular, the ASR model 200 receives the sequence of acoustic frames 110 extracted from audio data that corresponds to the utterance 106. During the first pass 301, the ASR model 200 processes the sequence of acoustic frames 110 to generate N candidate hypotheses 204 for the utterance 106. Here, each candidate hypothesis 204 corresponds to a candidate transcription 120 for the utterance 106 and is represented by a respective sequence of word, sub-word, and/or grapheme labels that are represented by a respective embedding vector. Moreover, each candidate hypothesis 204 includes a standalone score 205 that models prior statistics of the corresponding candidate hypothesis 204. That is, the standalone score 205 may indicate a confidence that the corresponding candidate hypothesis 204 is an accurate transcription for the utterance 106. The confidence of the standalone score 205 may also indicate a frequency of previously realized utterances 106 (e.g., a number of times that the candidate hypothesis 204 was previously spoken).

The ASR model 200 may generate any number of candidate hypotheses 204 (e.g., N may be any integer value). In some examples, the ASR model 200 outputs a specified number of candidate hypotheses 204 based on a predefined parameter. For instance, the ASR model 200 outputs five (5) candidate hypotheses 204 (i.e., N=5) for every spoken utterance 106. For instance, the N candidate hypotheses 204 may correspond to an N-best list of candidate hypotheses associated with the N candidate hypotheses having the highest standalone scores 205. In other examples, the ASR model 200 outputs all candidate hypotheses 204 having a standalone score 205 that satisfies a threshold value.

In the example shown, the ASR model 200 processes the sequence of acoustic frames 110 that corresponds to the utterance 106 "play next song" spoken by the user 104 and generates three candidate hypotheses 204 (i.e., N=3). Namely, the candidate hypotheses 204 include "play next song" having a standalone score 205 of 0.6, "hey next long" having a standalone score 205 of 0.3, and "play next pong" having a standalone score 205 of 0.8. Here, the rescoring process 300 may output the candidate hypothesis 204 "play next pong" as the partial transcription 120a (FIG. 1) because it has the highest standalone score 205. Alternatively, the rescoring process 300 may refrain from outputting the partial transcription until the rescoring process generates the final transcription. Notably, in this example, the candidate hypothesis 204 having the highest standalone score 205 is an inaccurate transcription of the utterance 106 spoken by the user 104.

The ASR model 200 may be a multilingual ASR model configured to recognize utterances 106 spoken in multiple languages. That is, the single ASR model 200 may receive an utterance 106 in a first language and generate N candidate hypotheses 204 in the first language and receive another utterance 106 in a different second language and generate N candidate hypotheses 204 in the second language. Moreover, the single ASR model may receive an utterance 106 including code-mixed speech that includes terms in both the first and second languages. Thus, the rescoring process 300 may implement the single multilingual ASR model 200 in a multilingual speech environment.

In some implementations, the second pass 302 may receive the N candidate hypotheses 204 from the first pass 301, and generate a corresponding overall score 355 by integrating additional information for each candidate hypothesis 204. The overall score 355 may indicate a more accurate confidence level than the standalone score 205 from the first pass 301 of whether each candidate hypothesis 204 is an accurate transcription. Thereafter, the second pass 302 may select the candidate hypothesis 204 having the highest overall score 355 as the transcription 120 (i.e., final transcription 120b (FIG. 1)).

More specifically, during the second pass 302, an external language model (LM) 310 receives the N candidate hypotheses 204 and generates a respective external language model score 315 for each candidate hypothesis 204. In some implementations, the external LM 310 includes a RNN LM. Here, the external LM 310 may include a plurality of language-specific external LMs 310, 310a-n each trained on text-only data (i.e., unpaired data) for a particular language. As such, external LM 310 and language-specific external LM 310 may be used interchangeably herein. Thus, each language-specific external LM 310 is configured to generate an external language model score (i.e., language model score) 315 for utterances 106 in a respective language. For example, a first language-specific external LM 310, 310a trained on English text-only data generates language model scores 315 for utterances 106 spoken in English, and a second language-specific external LM 310, 310b trained on Spanish text-only data generates language model scores 315 for utterances 106 spoken in Spanish. The plurality of external LMs 310 may by trained on any number of languages where each external LM 310 is trained with text-only data of a different respective language.

Accordingly, the external LM 310 may receive a language identifier 107 that indicates a language of the utterance 106 to select the language-specific external LM 310 from among the plurality of language-specific external LMs 310 that corresponds to the language of the utterance 106. Put another way, the rescoring process 300 may select the language-specific external LM 310 based on the language identifier 107. In some examples, the ASR model 200 determines the language identifier 107 based on processing the sequence of acoustic frames 110 of the utterance 106. In other examples, the ASR model 200 obtains the language identifier 107 from an external source. For instance, a user may configure the ASR model for a particular language. In other instances, the ASR model 200 may determine an identity of the user 104 that spoke the utterance 106 and identify the language identifier 107 based on a language associated with the identified user 104.

Accordingly, during the second pass 302, the rescoring process 300 selects the external LM 310 that corresponds to the language of the utterance 106 based on the language identifier 107, and generates the language model score 315 for each candidate hypothesis 204. The language model score 315 indicates a likelihood that the sequence of hypothesized terms in the candidate hypothesis 204 are spoken by the user 104. For example, the LM 310 will generate a higher language model score 315 for candidate hypothesis 204 "What is the weather today?" as opposed to the candidate hypothesis 204 "What is the weather hooray?" In particular, the LM 310 generates the higher language model score 315 for "What is the weather today?" because this sequence of hypothesized terms may have been included in the text-only training data more frequently than "What is the weather hooray?"

The example rescoring process 300 also includes the neural oracle search (NOS) model 320 that receives the N candidate hypotheses 204, the sequence of acoustic frames 110, and the label history 245 (e.g., previously output words, word-pieces, and/or graphemes). The label history 245 ($y_{0:i-1}$) may be output by the ASR model 200, the second pass 302 of the rescoring process 300 (e.g., via a rescorer 350), or some combination thereof. In some examples, the label history 245 includes a transcription for a previous utterance 106 spoken by the user 104. For instance, the user 104 may have previously spoke a previous utterance 106 of "do I have any meetings today?" that represents the label history 245 for a current utterance 106 of "what about tomorrow?" In other examples, the label history 245 includes all terms preceding a current label of the utterance. For instance, for the utterance 106 "play my playlist" the label history 245 may correspond to the terms "play my," where the current term (e.g., next hypothesized term) in the utterance 106 is "playlist." Optionally, the NOS model 320 may receive the language identifier 107 indicating the language of the utterance 106 spoken by the user 104.

FIG. 3A illustrates an example of the rescoring process 300, 300a that includes a plurality of language-specific NOS models 320S, 320Sa-n. Here, each language-specific NOS model 320S is trained on pairwise data (i.e., transcribed audio training data) of a particular language. Accordingly, during the second pass 302, the rescoring process 300 selects a language-specific NOS model 320S from among the plurality of language-specific NOS models 320S that corresponds to the language of the utterance 106 based on the language identifier 107. As such, the example rescoring process 300a assumes that the language identifier 107 is available to select the correct language-specific NOS model 320S.

Alternatively, FIG. 3B illustrates an example rescoring process 300, 300b that includes a multilingual NOS model 320, 320M. In this example, the multilingual NOS model 320M is trained on pairwise data (i.e., transcribed audio training data) for any number of languages. Thus, the example rescoring process 300b may implement a single multilingual NOS model 320M in a multilingual speech environment. Notably, the example rescoring process 300b does not require the use of any language identifier 107 since selection of a language-specific NOS model 320S (as described with reference to FIG. 3A) associated with the language of the utterance 106 is not required. Thus, the utterance 106 may include a multilingual utterance that includes codemixing of speech across two or more languages. As used herein, the NOS model 320 may include either a language-specific NOS model 320S (FIG. 3A) that the rescoring process 300a selects based on the language identifier 107 or the multilingual NOS model (FIG. 3B).

With continued reference to FIGS. 3A and 3B, the NOS model 320 includes a prior model that predicts the next label $Y_i$ given the label history 245. That is, the prior model predicts a prior score for the next label based on previously recognized word, word-pieces, and/or graphemes. The prior model of the NOS model 320 may include a two-layer, 512 units per layer unidirectional LSTM. The prior model trains using labeled audio training data and a cross-entropy loss. Moreover, the NOS model 320 includes a posterior model that predicts a posterior score by combining the label history 245 with the sequence of acoustic frames 110 from the first pass 301 in a label-synchronous fashion. The posterior model of the NOS model 320 may include a two-layer, 512 units per layer unidirectional LSTM, with a two-layer, 128 units per layer label synchronous attention mechanism. The posterior model trains with labeled audio training data and a cross-entropy loss to predict the next label $Y_i$ given the label history 245 and the sequence of acoustic frames 110. The NOS model 320 sums the token level prior score and the token level posterior score to generate the un-normalized likelihood score 325. As such, the un-normalized likelihood score 325 is a sequence level score represented by the summation as follows:

$$S_{\theta_1}(X|Y=y_{0:U}) = \sum_{i=0}^{U} \phi(X, y_{0:i-1}|Y_i = y) \quad (1)$$
$$\propto \sum_{i=0}^{U} \log P(Y_i = y|X, y_{0:i-1})$$
$$- \sum_{i=0}^{U} \log P(Y_i = y|y_{0:i-1})$$
$$= \log P(Y|X) - \log P(Y)$$
$$\propto \log P(X|Y)$$

In Equation 1, $S_{\theta_1}$ represents the un-normalized likelihood score 325, The rescorer 350 receives the standalone score 205, the language model score 315, and the un-normalized likelihood score 325 for each candidate hypothesis 204 of the N candidate hypotheses 204 and generates the respective overall score 355. In particular, the rescorer 350 generates the overall score 355 for each candidate hypothesis 204 based on any combination of the standalone score 205, the language model score 315, and the un-normalized likelihood score 325. In some examples, the rescorer 350 sums the standalone score 205, the language model score 315, and the un-normalized likelihood score 325 linearly to determine a sequence-level overall score 355 represented by:

$$\tilde{P}(\text{Oracle} = i|X, H_{1:N}) = \frac{\exp(\text{Score}(H_i, X))}{\sum_j \exp(\text{Score}(H_j, X))} \quad (2)$$

$$\text{Score}(H_i, X) = \lambda_1 S_{\theta_1}(X|H_i) + \lambda_2 S_{\theta_2}(H_i) + S_{\theta_3}(i) \quad (3)$$

In Equation 3, $S_{\theta_1}$ represents the un-normalized likelihood score 325, $S_{\theta_2}$ represents the external language model score 315, and $S_{\theta_3}$ represents the standalone score 205. To optimize model parameters of the rescorer 350 during training, the rescoring process 300 uses a cross-entropy objective between the posterior score and a sequence-level ground truth distribution. In some examples, the training process assigns the total ground truth distribution to the ground-truth transcription and assigns all other candidate hypotheses to zero. In other examples, the training process assigns the total ground truth distribution uniformly across all candidate hypotheses having a word error rate (WER) below the best candidate hypothesis (i.e., ground truth transcription). In yet other examples, the training process applies a Softmax function to a negative edit-distance between each candidate hypothesis and the ground truth transcription.

Thereafter, the rescorer 350 selects the candidate hypothesis 204 from among the N candidate hypotheses 204 having the highest overall score 355 as a final transcription 120 of the utterance 106. In the example shown, the candidate hypotheses 204 include "play next song" having an overall score 205 of 0.9, "hey next long" having an overall score 205 of 0.3, and "play next pong" having an overall score 205 of 0.5. Continuing with the example, the rescorer 250 selects the candidate hypothesis 204 of "play next song" (denoted by the solid line box) having the highest overall score 205 of 0.9 as the transcription 120 (e.g., final transcription 120b (FIG. 1)). Notably, the candidate hypothesis 204 with the highest standalone score 205 (i.e., likelihood of being the correct transcription) is not the correct candidate hypothesis 204, but the candidate hypothesis with the highest overall score 355 is the correct transcription from the second pass 302.

Figure 4:
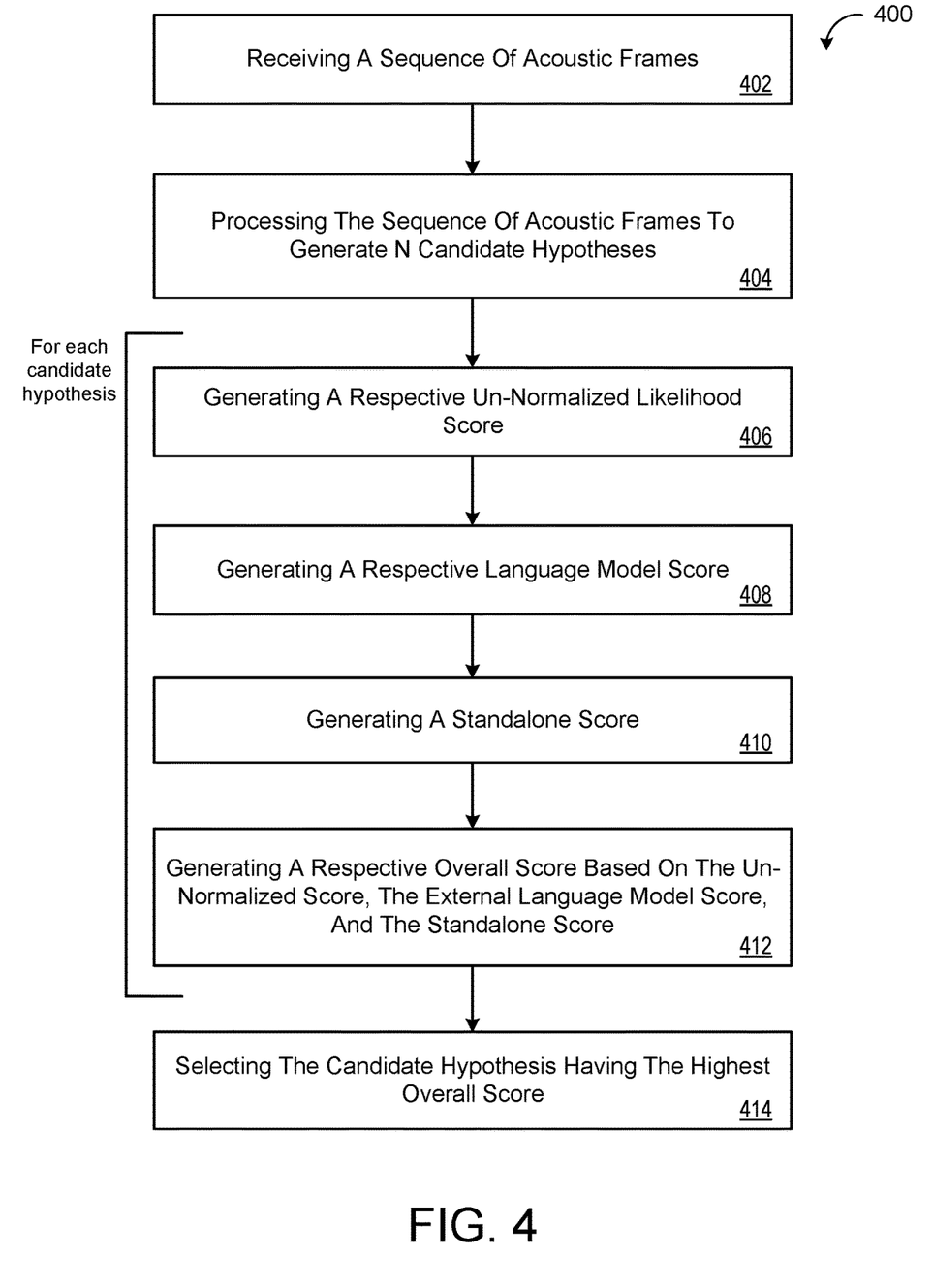
FIG. 4 is a flow chart of an example arrangement of operations for a method of using multilingual re-scoring models for automatic speech recognition.

FIG. 4 is a flowchart of an exemplary arrangement of operations for a computer-implemented method 400 of using multi-lingual re-scoring models for automatic speech recognition. At operation 402, the method 400 includes receiving a sequence of acoustic frames 110 extracted from audio data that corresponds to an utterance 106. At operation 404, during a first pass 301, the method 400 includes processing the sequence of acoustic frames 110 to generate N candidate hypotheses 204, 204a-n for the utterance 106 using a multilingual speech recognition model (i.e., ASR model) 200. During a second pass 302, for each candidate hypothesis 204 of the N candidate hypotheses 204, the method 400 performs operations 406-412. At operation 406, the method 400 includes generating a respective un-normalized likelihood score 325 using a NOS model 320. Here, the NOS model 320 generates the un-normalized likelihood score 325 based on the sequence of acoustic frames 110 and the corresponding candidate hypothesis 204. At operation 408, the method 400 includes generating a respective external language model score 315 using a language model 310. At operation 410, the method 400 includes generating a standalone score 205 that models prior statistics of the corresponding candidate hypothesis 204 generated during the first pass 301. At operation 412, the method 400 includes generating a respective overall score 355 for the candidate hypothesis 255 based on the un-normalized likelihood score 325, the external language model score 315, and the standalone score 205. At operation 414, the method 400 includes selecting the candidate hypothesis 204 having the highest respective overall score 355 from among the N candidate hypotheses 204 as a final transcription 120 of the utterance 106.

Figure 5:
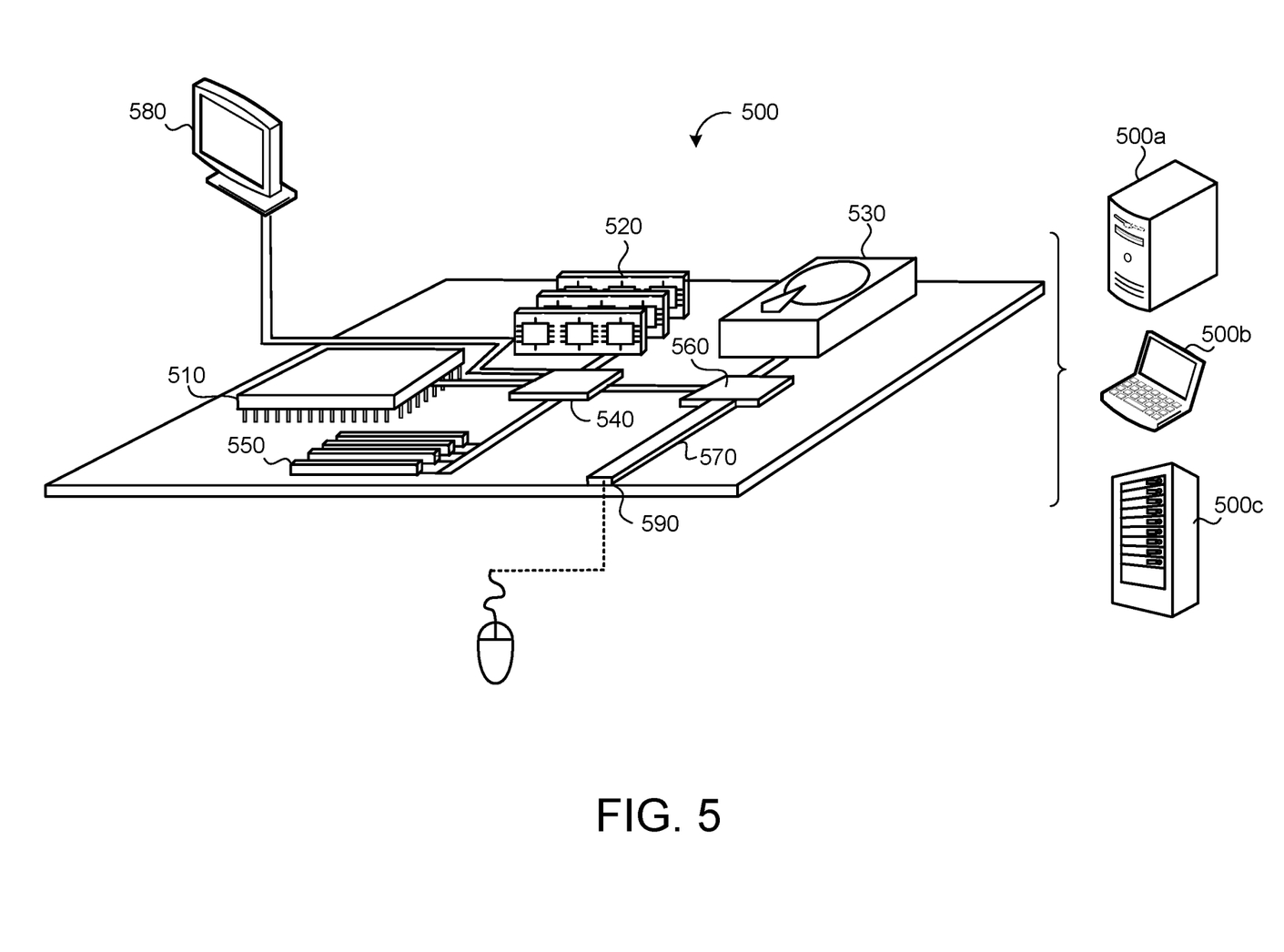
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
    receiving transcribed audio training data comprising training audio data corresponding to an utterance paired with a ground-truth transcription of the utterance;
    during a first pass, processing, using a speech recognition model, the training audio data to generate N candidate hypotheses for the utterance, each corresponding candidate hypothesis among the N candidate hypotheses having a respective first pass score;
    during a second pass, for each corresponding candidate hypothesis of the N candidate hypotheses:
        generating, using a neural network rescoring model, a respective second pass score based on the respective first pass score for the corresponding candidate hypothesis; and
        applying a Softmax function to a respective negative edit-distance between the corresponding candidate hypothesis and the ground-truth transcription; and
    optimizing model parameters of the neural network rescoring model based on the Softmax function applied to the respective negative edit-distance between the ground-truth transcription and each corresponding candidate hypothesis among the N candidate hypotheses.

2. The method of claim 1, wherein the speech recognition model comprises a recurrent neural network-transducer (RNN-T) architecture.

3. The method of claim 1, wherein each corresponding candidate hypothesis among the N candidate hypotheses comprises a respective sequence of word labels, each word label represented by a respective embedding vector.

4. The method of claim 1, wherein each corresponding candidate hypothesis among the N candidate hypotheses comprises a respective sequence of sub-word labels, each sub-word label represented by a respective embedding vector.

5. The method of claim 1, wherein the N candidate hypotheses generated using the speech recognition model during the first pass comprises an N-best list of candidate hypotheses.

6. The method of claim 1, wherein the speech recognition model comprises an encoder-decoder architecture including a conformer encoder having a plurality of conformer layers.

7. The method of claim 1, wherein the speech recognition model comprises an encoder-decoder architecture including a transformer encoder having a plurality of transformer layers.

8. The method of claim 1, wherein the operations further comprise selecting one of the N candidate hypotheses as a final transcription of the utterance based on the respective second pass scores generated for the N candidate hypotheses.

9. The method of claim 1, wherein the neural network rescoring model comprises a language-specific neural network rescoring model.

10. The method of claim 1, wherein the neural network rescoring model comprises a multilingual neural network rescoring model.

11. A system comprising:
  data processing hardware; and
  memory hardware in communication with the data processing hardware, the memory hardware storing instructions that when executed on the data processing hardware cause the data processing hardware to perform operations comprising:
    receiving transcribed audio training data comprising training audio data corresponding to an utterance paired with a ground-truth transcription of the utterance;
    during a first pass, processing, using a speech recognition model, the training audio data to generate N candidate hypotheses for the utterance, each corresponding candidate hypothesis among the N candidate hypotheses having a respective first pass score;
    during a second pass, for each corresponding candidate hypothesis of the N candidate hypotheses:
      generating, using a neural network rescoring model, a respective second pass score based on the respective first pass score for the corresponding candidate hypothesis; and
      applying a Softmax function to a respective negative edit-distance between the corresponding candidate hypothesis and the ground-truth transcription; and
    optimizing model parameters of the neural network rescoring model based on the Softmax function applied to the respective negative edit-distance between the ground-truth transcription and each corresponding candidate hypothesis among the N candidate hypotheses.

12. The system of claim 11, wherein the speech recognition model comprises a recurrent neural network-transducer (RNN-T) architecture.

13. The system of claim 11, wherein each corresponding candidate hypothesis among the N candidate hypotheses comprises a respective sequence of word labels, each word label represented by a respective embedding vector.

14. The system of claim 11, wherein each corresponding candidate hypothesis among the N candidate hypotheses comprises a respective sequence of sub-word labels, each sub-word label represented by a respective embedding vector.

15. The system of claim 11, wherein the N candidate hypotheses generated using the speech recognition model during the first pass comprises an N-best list of candidate hypotheses.

16. The system of claim 11, wherein the speech recognition model comprises an encoder-decoder architecture including a conformer encoder having a plurality of conformer layers.

17. The system of claim 11, wherein the speech recognition model comprises an encoder-decoder architecture including a transformer encoder having a plurality of transformer layers.

18. The system of claim 11, wherein the operations further comprise selecting one of the N candidate hypotheses as a final transcription of the utterance based on the respective second pass scores generated for the N candidate hypotheses.

19. The system of claim 11, wherein the neural network rescoring model comprises a language-specific neural network rescoring model.

20. The system of claim 11, wherein the neural network rescoring model comprises a multilingual neural network rescoring model.

* * * * *